UNITED STATES PATENT OFFICE.

LEOPOLD POLLAK, OF AUSSIG, AUSTRIA-HUNGARY, ASSIGNOR TO BADISCHE ANILIN & SODA FABRIK, OF LUDWIGSHAFEN-ON-THE-RHINE, GERMANY, A CORPORATION.

COMPOUNDS FOR TANNING SKINS AND PROCESS OF MAKING THEM.

1,107,107.     Specification of Letters Patent.     Patented Aug. 11, 1914.

No Drawing.     Application filed June 26, 1914. Serial No. 847,503.

*To all whom it may concern:*

Be it known that I, LEOPOLD POLLAK, a citizen of the Austro-Hungarian Empire, residing at Aussig a. E., Austria-Hungary, have invented new and useful Improvements in Compounds for Tanning Skins and Processes of Making Them, of which the following is a specification.

My invention relates to a new class of compounds, which are suitable for use as tanning agents.

I obtain my new compounds from a monohydroxy phenol, sulfuric acid and a carbohydrate. Instead of sulfuric acid, I can make use of any other reagent which effects the introduction of a sulfonic acid group, for instance, a substituted sulfuric acid such as chlor-sulfonic acid. Such reagents are equivalent to sulfuric acid. As instances of carbohydrates, or bodies containing carbohydrates, which can be used according to my invention, I mention grape sugar, and other sugars, also starch, dextrin, cellulose, sawdust and paper. I can carry out the reaction of this invention, for instance, by allowing all the three ingredients to react on one another at the same time, or I can take a phenol sulfonic acid, and treat it with the carbohydrate, or I can first treat the phenol with a carbohydrate such as sugar, and then react on the product with sulfuric acid. It is often advisable to add some acetic acid to the reaction mixture, for instance, when sugar is allowed to react with phenol, and the product is subsequently sulfonated. In any case the process should be carried out under such conditions, that a product soluble in water is obtained, but too high a temperature should be avoided. The product can often be lightened in color by subsequent treatment with a sulfite or hydrosulfite.

My new products are characterized by possessing the following properties. They are amorphous bodies containing sulfur, are soluble in water, yielding solutions which give deep colorations with ferric ammonium sulfate solution, precipitate glue solution, tan skins, and even in a solution of normal acidity and of 20° Bé. tan skins without destroying them. Such a solution of normal acidity can be obtained by adding so much alkali that 10 grams of the product require 10 ccm. of normal caustic alkali solution for complete neutralization.

The following are examples which illustrate my invention, without, however, limiting it in any way. The parts are by weight.

Example 1: Add one half of a part of glacial acetic acid to five parts of phenol, and then dissolve one part of grape sugar in the mixture. Then add, while cooling, five parts of 98% sulfuric acid, and heat for some time at 100–120° C. until the product is completely soluble in water. In some cases, the addition of the sulfuric acid causes such an evolution of heat, that further application of heat is unnecessary. A viscous mass is obtained, which is soluble in water, and the solution can be directly employed for tanning purposes. I prefer, however, first to add some alkaline material, for instance, caustic soda, or sodium carbonate, without, however, reaching or passing the point at which a neutral solution is obtained. On being shaken with ammonium acetate and a little alum solution, this product gives rise to a flocculent precipitate, either at once, or after standing for some time. I prefer to carry out this test by taking 10 cc. of a 5% solution of the material, adding 2 drops of a 1% solution of alum, then adding 5 grams of solid ammonium acetate and then shaking vigorously.

Example 2: Heat together equal quantities of phenol and of 98% sulfuric acid until the product is completely soluble in water, then add one-fifth of a part of grape sugar and heat for a considerable time, and at a moderate temperature, until the reaction product is again completely soluble in water. If desired, the second part of the reaction can be accelerated by the addition of a small quantity of sulfuric acid.

In a similar manner, other carbohydrates can be employed instead of grape sugar, and if desired other condensation agents, such as hydrochloric acid can be employed, provided care be taken that the final product contains so much of the sulfuric acid residue, that it is soluble in water.

What I claim is:—

1. The new compounds derived from a monohydroxy phenol, sulfuric acid and a carbohydrate, which new compounds are amorphous, contain sulfur, are soluble in water, yielding solutions which give deep colorations with ferric ammonium sulfate solution, precipitate glue solution, tan skins, and even in a solution of normal acidity and of 20° Bé. tan skins without destroying them.

2. The new compound derived from phenol, sulfuric acid and grape sugar, which compound is amorphous, contains sulfur, is soluble in water yielding solutions which give deep colorations with ferric ammonium sulfate solution, precipitate glue solution, tan skins, and even at a concentration of 20° Bé. tan skins without destroying them, and which solutions, on being shaken with ammonium acetate and a little alum solution, give rise to a flocculent precipitate.

3. The process of producing new compounds suitable for tanning by condensing together a mono-hydroxy phenol, sulfuric acid and a carbohydrate.

4. The process of producing a new compound suitable for tanning by condensing together phenol, sulfuric acid and grape sugar.

5. The process of producing a new compound suitable for tanning by condensing together five parts of phenol, five parts of 98% sulfuric acid and one part of grape sugar.

Signed this 15 day of June, 1914.

LEOPOLD POLLAK.

Witnesses:
PAUL ARRAS,
ALISON BUCHANAN.